US012677148B1

(12) United States Patent
Wan

(10) Patent No.: US 12,677,148 B1
(45) Date of Patent: Jul. 7, 2026

(54) SYSTEMS AND METHODS FOR CREDENTIAL HOLDER SUPPORT USING AAA IN NON-3GPP ACCESS

(71) Applicant: CABLE TELEVISION LABORATORIES, INC., Louisville, CO (US)

(72) Inventor: Tao Wan, Ottawa (CA)

(73) Assignee: Cable Television Laboratories, Inc., Louisville, CO (US)

( * ) Notice: Subject to any disclaimer, the term of this patent is extended or adjusted under 35 U.S.C. 154(b) by 104 days.

(21) Appl. No.: 18/631,936

(22) Filed: Apr. 10, 2024

Related U.S. Application Data

(60) Provisional application No. 63/547,786, filed on Nov. 8, 2023, provisional application No. 63/466,488, filed on May 15, 2023, provisional application No. 63/465,789, filed on May 11, 2023, provisional application No. 63/458,273, filed on Apr. 10, 2023.

(51) Int. Cl.
| | |
|---|---|
| *H04L 29/06* | (2006.01) |
| *H04W 12/06* | (2021.01) |
| *H04W 12/08* | (2021.01) |

(52) U.S. Cl.
CPC ........... *H04W 12/06* (2013.01); *H04W 12/08* (2013.01)

(58) Field of Classification Search
CPC .............................. H04W 12/06; H04W 12/08
See application file for complete search history.

(56) References Cited

U.S. PATENT DOCUMENTS

| | | | | |
|---|---|---|---|---|
| 2022/0386120 A1* | 12/2022 | Kim | .................... | H04L 63/0892 |
| 2023/0016347 A1* | 1/2023 | Nair | ...................... | H04W 12/72 |
| 2023/0106668 A1* | 4/2023 | Taft | ...................... | H04W 12/06 |
| | | | | 726/2 |
| 2023/0232198 A1* | 7/2023 | Salkintzis | ............. | H04W 12/08 |
| | | | | 455/411 |

(Continued)

OTHER PUBLICATIONS

A. Kunz and A. Salkintzis, "Non-3GPP Access Security in 5G," in Journal of ICT Standardization, vol. 8, No. 1, pp. 41-56, 2020, doi: 10.13052/jicts2245-800X.814. (Year: 2020).*

(Continued)

*Primary Examiner* — Ka Shan Choy
(74) *Attorney, Agent, or Firm* — Volpe Koenig

(57) ABSTRACT
A method is provided for accessing a non-public network (NPN) by a communication device utilizing a credential management system, including steps of (a) receiving, from the device through non-3GPP access means, a first authentication request at an authentication server function (AUSF) of a 5G core (5GC) in communication with the NPN, (b) sending a second authentication request from the AUSF to a network slice-specific authentication and authorization function (NSSAAF) of the 5GC, (c) transmitting, from the NSSAAF, an EAP response/identity message to an AAA server in communication with the credential management system, (d) performing, based on the transmitted EAP response/identity message, EAP-based authentication between the AAA server and the communications device, (e) receiving, at the NSSAAF from the AAA server, and EAP success message, (f) receiving, at the AUSF from the NSSAAF, a first authentication response, and (g) authenticating the communication device with the NPN.

20 Claims, 5 Drawing Sheets

(56)     References Cited

U.S. PATENT DOCUMENTS

2024/0073685 A1*   2/2024   Zhang .................... H04L 9/0844
2024/0357362 A1*  10/2024   Gu ........................ H04W 12/06

OTHER PUBLICATIONS

3GPP TR 33.858, V1.0.0 (Mar. 2023) 3rd Generation Partnership Project; Technical Specification Group Services and System Aspects; Study on security aspects of enhanced support of Non-Public Networks phase 2; (Release 18) Mar. 2023.

3GPP TR 33.858, V0.5.0 (Mar. 2023) 3rd Generation Partnership Project; Technical Specification Group Services and System Aspects; Study on security aspects of enhanced support of Non-Public Networks phase 2; (Release 18) Mar. 2023.

3GPP Ts 33.501, V18.1.0 (Mar. 2023) 3rd Generation Partnership Project; Technical Specification Group Services and System Aspects; Security architecture and procedures for 5G System.(Release 18) Mar. 2023.

"Cable Labs, "Additional conclusions on credential holder for KI#1," 3GPPP TSG-SA3 Meeting #110Ad-Hoc-e, S3-23xxx, Electronic meeting (Apr. 17-21, 2023)."

"Cable Labs, "Solution using credential holder AAA for NSWO via 5GC," 3GPP TSG-SA3 Meeting #111, S3-232aaa, Berlin, Germany, (May 22-26, 2023)."

"Cable Labs, "Solutions using credential holder for KI#1," 3GPP TSG-SA3 Meeting #110Ad-Hoc-e, S3-23xxxx, Electronic meeting, (Apr. 17-21 2023)."

"Cable Labs, "N5CW devices using credential holder for primary authentication," 3GPP TSG-SA3 Meeting #111, S3-232zzz, Berlin, Germany, (May 22-26, 2023)."

"Cable Labs, "Using credential holder for primary authentication in Trusted N3GPP access," 3GPP TSG-SA3 Meeting #111, S3-232xxx, Berlin, Germany, (May 22-26, 2023)."

"Cable Labs, "Using credential holder for primary authentication in Untrusted N3GPP access," 3GPP TSG-SA3 Meeting #111, S3-232yyy, Berlin, Germany, (May 22-26, 2023)."

* cited by examiner

SYSTEMS AND METHODS FOR CREDENTIAL HOLDER SUPPORT USING AAA IN NON-3GPP ACCESS

CROSS REFERENCE TO RELATED APPLICATIONS

This application claims the benefit of and priority to U.S. Provisional Application No. 63/458,273, filed Apr. 10, 2023, U.S. Provisional Application No. 63/465,789, filed May 11, 2023, U.S. Provisional Application No. 63/466,488, filed May 15, 2023, and U.S. Provisional Application No. 63/547, 786, filed Nov. 8, 2023. The subject matter of all of these prior applications are hereby incorporated by reference in their entireties.

BACKGROUND

The field of the invention relates generally to communication systems, and more specifically, to systems and methods regarding credential support for 5G networks.

The Third Generation Partnership Project (3GPP) sets standards for mobile and cellular telecommunications technologies, including radio access, core network, and service capabilities. These standards are defined by a number of 3GPP Technical Specifications (TSs) and Technical Reports (TRs), which further provide hooks for non-radio access to the core network, and for interworking with non-3GPP networks. 3GPP technologies continue to evolve to cover further generations beyond 3G, including Fifth Generation (5G) and Long Term Evolution (LTE) networks and communications.

3GPP TS 33.501 (V18.1.0, Mar. 30, 2023) defines security architecture and procedures for the 5G system (5GS), and 3GPP TR 33.858 (V1.0.0, Mar. 13, 2013) evaluates security aspects of enhanced support of non-public networks (NPNs). Clause I.2.2 of TS 33.501 specifies the Extensible Authentication Protocol (EAP) framework, the selection of authentication method, and the EAP method credentials supported by the 5GS, which include 3GPP access features for authentication in a stand-alone NPN (SNPN) supporting (a) authentication server function (AUSF), and (b) credentials holder using the Authentication, Authorization, and Accounting (AAA) server for primary authentication. However, for non-3GPP access in the SNPN, conventional solutions have only been provided regarding feature (a), i.e., support for AUSF.

Accordingly, there is a need, with regard to the non-3GPP access paradigm, for new techniques supporting credentials holder using the AAA server for primary authentication in SNPN.

SUMMARY

In an embodiment, a method is provided for accessing a non-public network (NPN) by a communication device utilizing a credential management system. The method includes steps of (a) receiving, from the communication device through non-3GPP access means, a first authentication request at an authentication server function (AUSF) of a 5G core (5GC) in communication with the NPN, (b) sending a second authentication request, from the AUSF to a network slice-specific authentication and authorization function (NSSAAF) of the 5GC, (c) transmitting, from the NSSAAF, an extensible authentication protocol (EAP) response/identity message to an authentication, authorization, and accounting (AAA) server in communication with the credential management system, (d) performing, based on the transmitted EAP response/identity message, EAP-based authentication between the AAA server and the communications device, (e) receiving, at the NSSAAF from the AAA server, and EAP success message, (f) receiving, at the AUSF from the NSSAAF, an authentication response, and (g) authenticating the communication device with the NPN.

In an embodiment, a system is provided for enabling a user equipment device (UE) to accessing a standalone non-public network (SNPN) utilizing a credential management subsystem. The system includes an authentication server function (AUSF) of a 5G core (5GC) in communication with the SNPN, a processor, and a memory. The memory includes computer-executable instructions stored therein, which, when executed by the processor, cause the AUSF to: (a) receive, from the UE through non-3GPP (N3GPP) access means, a first authentication request. The first authentication request includes a service network (SN)-name and one of (i) a subscriber/subscription concealed ID (SUCI) and an NSWO_indicator, and (ii) a subscriber/subscription Permanent ID (SUPI) and an NSWO_indicator. The instructions further cause the AUSF to (b) send a second authentication request to an authentication, authorization, and accounting (AAA) server in communication with the credential management system. The second authentication request includes the SUPI. The instructions further cause the AUSF to (c) enable, based on the transmitted EAP response/ identity message, EAP-based authentication between the AAA server and the UE, (d) receive, at the AUSF, an authentication response message. The authentication response includes the SUPI, an EAP success message, and a master session key (MSK) provided by the AAA server. The instructions further cause the AUSF to (e) authenticate the communication device with the SNPN based on the received first authentication response.

BRIEF DESCRIPTION

These and other features, aspects, and advantages of the present disclosure will become better understood when the following detailed description is read with reference to the following accompanying drawings, in which like characters represent like parts throughout the drawings.

Figure 1:
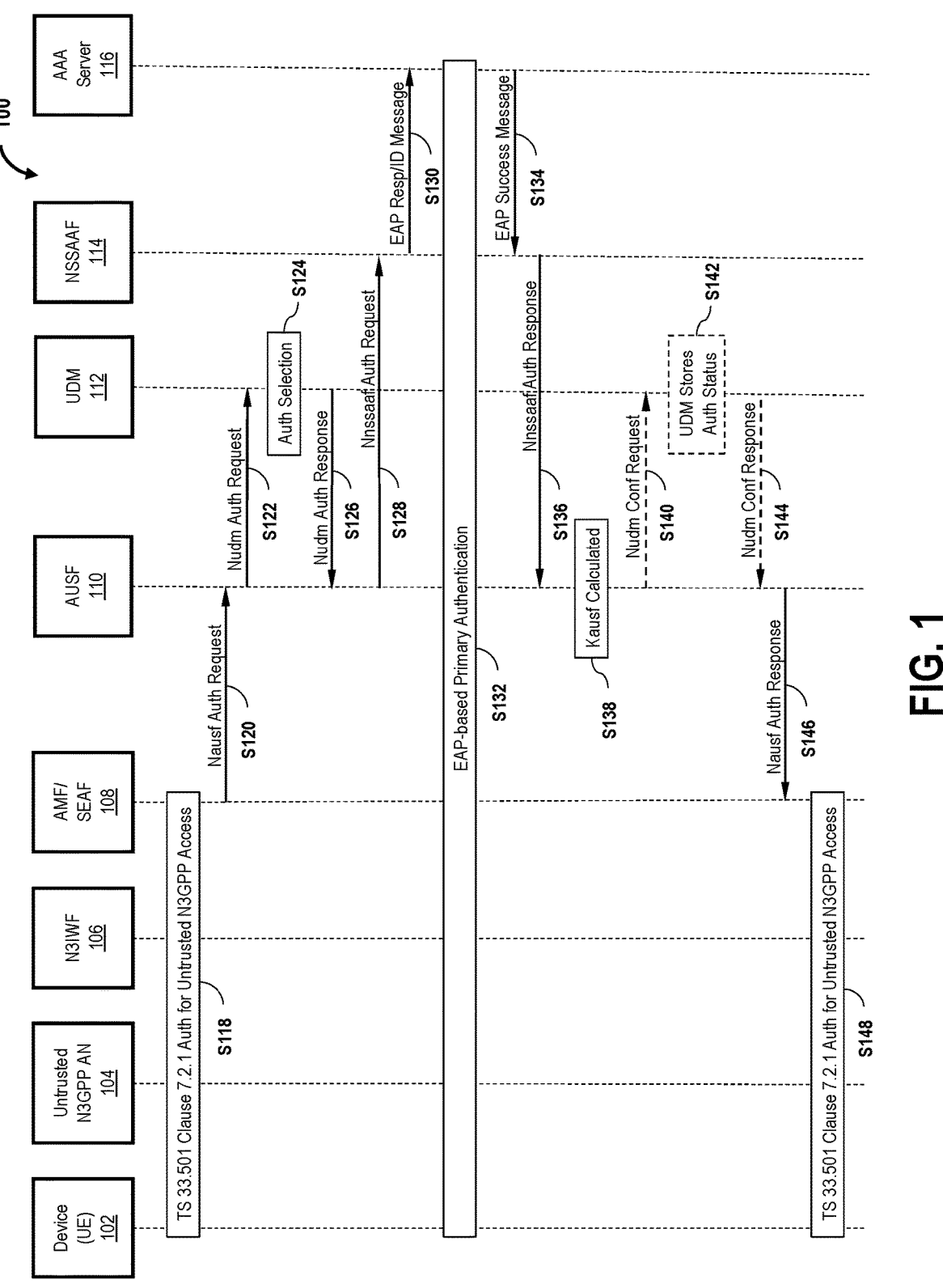
FIG. 1 is a sequence flow diagram depicting an exemplary authentication process through an untrusted non-3GPP access type, in accordance with an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random-access memory (RAM), and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable and include any computer program storage in memory for execution by personal computers, workstations, clients, servers, and respective processing elements thereof.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events may be considered to occur substantially instantaneously.

As described herein, "user equipment," or UE, refers to an electronic device or system utilizing a wireless technology protocol, such as Long Term Evolution (LTE), 5G or WiMAX (e.g., IEEE 802.16 protocols), and may include therein Wi-Fi capability to access and implement one or more existing IEEE 802.11 protocols. A UE may be fixed, mobile, or portable, and may include a transceiver or transmitter-and-receiver combination. A UE may have separate components, or may be integrated as a single device that includes a media access control (MAC) and physical layer (PHY) interface, both of which may be 802.11-conformant and/or 802.16-conformant to a wireless medium (WM).

As used herein, a "Non-3GPP," or N3GPP, device is a device that utilizes non-3GPP access technology to connect to non-3GPP access network, which may or may not support the Non Access Stratum (NAS) over the N3GPP access.

The innovative systems and methods described herein provide unique solutions relating to gaps in earlier versions of 3GPP TS 33.501 that did not specify support for credentials holder using the AAA server for primary authentication (e.g., clause 1.2.2.2) with respect to non-3GPP access in the SNPN, including without limitation, untrusted non-3GPP access, trusted non-3GPP access, trusted wireless local area network (WLAN) access (e.g., non-5G Capable over WLAN (N5CW) devices), and Non-Seamless WLAN Offload (NSWO) procedures. 3GPP TR 23.700-08 Clause 8.2, for example, specifies that N3GPP access to the SNPN includes (i) untrusted/trusted N3GPP access, including support for onboarding, and (ii) NSWO access to the SNPN using SNPN credentials. The subject matter from all of 3GPP TS 33.501, TS 23.700, and TR 33.858 are incorporated by reference herein in their entireties.

As described further below in greater detail, the present systems and methods do not merely execute the 3GPP access techniques from 3GPP TS 33.501 Clause I.2.2.2 to the non-3GPP scenario; the present embodiments solve the unique challenges to application of such 3GPP access techniques to non-3GPP access scenarios. The novelty and nonobviousness of the present solutions is demonstrated, for example, by the recognition of the 3GPP standards body and adoption of the present solutions (i.e., after the priority dates of the present subject matter) into the most recent release of 3GPP 33.501 V18.4.0, Jan. 4, 2024.

More specifically, 3GPP 33.501 V18.4.0 acknowledges the present solutions that address 3GPP Key Issue #1 (KI #1) on Security of Non-3GPP Access for SNPN. For example, the present systems and methods provide innovative support for a credentials holder using the AAA server for primary authentication between the communication device/UE and the AAA server in the N3GPP access case of: (a) untrusted non-3GPP access in the SNPN; (b) trusted non-3GPP access in the SNPN; (c) trusted WLAN access for N5CW devices in the SNPN; (d) NSWO in the SNPN. That is, the present solutions address the requirement of KI #1 providing new procedures to integrate the 3GPP access SNPN primary authentication to procedures from 3GPP TS 33.501 Clause 1.2.2.2 for N3GPP access, including untrusted N3GPP access, trusted N3GPP access, trusted WLAN access/N5CW devices, and NSWO access. By integrating with existing 3GPP standards, the present systems and methods advantageously avoid the need for significant hardware and/or software modifications to the 5GS.

FIG. 1 is a sequence flow diagram depicting an exemplary authentication process 100 through an untrusted N3GPP access type. In an exemplary embodiment, process 100 is executed among and with respect to a communication device 102 (e.g., a UE), an untrusted N3GPP access network 104, an N3GPP Interworking Function (N3IWF) 106, an Access and Mobility management Function (AMF) 108, an Authentication Server Function (AUSF) 110, a Unified Data Management subsystem (UDM) 112 (e.g., a central node for managing subscription data and user authentication information), a Network Slice-Specific Authentication and Authorization Function (NSSAAF) 114, and an AAA server 116. In an embodiment, AMF 108 may include SEcurity Anchor Functionality (SEAF). Unless described below to the contrary, one or more of the several steps, subprocesses, and/or subroutines of process 100 may be performed in a different order, and/or two or more of the several steps/subprocesses/subroutines may be performed simultaneously.

In exemplary operation, process 100 begins at step S118, in which UE 102 accesses AMF 108 through an untrusted N3GPP access type (e.g., untrusted N3GPP access network 104 and N3IWF 106). In an exemplary embodiment of step S118, registration and/or authentication execution between UE 102 and AMF 108 may be performed according to the procedures for Untrusted N3GPP Access specified in 3GPP TS 33.501 Clause 7.2.1 (i.e., steps 1a-6b). In step S120, AMF 108 sends an Nausf authentication request to AUSF 110. In an exemplary embodiment of step S120, the Nausf authentication request may be an Nausf_UEAuthentication_AuthenticateRequest message, and may include one or more of an SUbscriber/SUbscription concealed ID (SUCI) or SUbscriber/SUbscription Permanent ID (SUPI), and a Service Network (SN)-name.

In step S122, AUSF 110 sends an Nudm authentication request to UDM 112. In an exemplary embodiment of step S122, the Nudm authentication request may be an Nudm_UEAuthentication_Get_Request message, and may include one or more of the SUCI or SUPI, and the SN-name. In step S124, the authentication method may be selected at UDM 112 based on the received Nudm authentication request. In step S126, UDM 112 sends AUSF 110 an Nudm authentication response. In an exemplary embodiment of step S126, the Nudm authentication response may be a Nudm_UEAuthentication_Get_Response message, which may include one or more of a SUbscriber/SUbscription Permanent ID (SUPI) and an AuthAAA information element (IE).

In step S128, based on the received Nudm authentication response, AUSF 110 sends an Nnssaaf authentication request to NSSAAF 114. In an exemplary embodiment of step S128, the Nnssaaf authentication request may be an Nnssaaf_AIWF_Authentication_Request message, which may further include the SUPI. In step S130, NSSAAF 114 sends an EAP Response/Identity message to AAA server 116. In step S132, AAA server executes EAP-based primary authentication with UE 102. In step S134, AAA server 116 sends an EAP Success message to NSSAAF 114.

In step S136, NSSAAF 114 sends an Nnssaaf authentication response to AUSF 110. In an exemplary embodiment of step S136, the Nnssaaf authentication response may be an Nnssaaf_AIWF_Authentication_Response message, which may further include one or more of the EAP Success message, the SUPI, and a master session key (MSK). In step S138, a Kausf key may be calculated from the MSK received in step S136.

Steps S140 through S144 are optional steps. In step S140, AUSF 110 may send an Nudm confirmation request to UDM 112, such as an Nudm_UEAU_ResultConfirmation_Request message, which may include the SUPI. In step S142, UDM 112 may store the authentication status and, in step S144, send an Nudm confirmation response, such as an Nudm_UEAU_ResultConfirmation_Response message, to AUSF 112.

In step S146, AUSF 110 sends an Nausf authentication response to AMF 108. In an exemplary embodiment of step S146, the Nausf authentication response may be an Nausf_UEAuthentication_AuthenticateResponse message, and may include one or more of the EAP Success message, the SUPI, and a Kseaf key. In step S148, AMF 108 authenticates and registers UE 102 through untrusted N3GPP access network 104 and N3IWF 106. In an exemplary embodiment of step S148, registration and authentication of UE 102 by AMF 108 may be performed according to remaining procedures for Untrusted N3GPP Access specified in 3GPP TS 33.501 Clause 7.2.1 (i.e., steps 9-17).

According to the exemplary embodiment depicted in FIG. 1, process 100 advantageously enables support, in the NG3GPP access context, for (a) credentials holder using the AAA server for primary authentication (e.g., similar to the 3GPP access context specified in 3GPP TS 33.501 Clause I.2.2.2, and (b) essentially all key-generating EAP-based processes. For example, the applicable authentication mechanism selected in step S124 may be extended to a variety of N3GPP key-generating EAP authentication methods.

Systems and methods according to process 100 further advantageously support (a) onboarding, for example, by enabling the capability to transmit an onboarding SUCI (e.g., steps S120, S122), and (b) utilization of an anonymous SUCI (e.g., steps S120, S122, S124), such as in case where a SUCI constructed according to 3GPP TS 33.501 Clause 6.12 cannot be utilized, assuming that the particular EAP method used supports privacy.

Figure 2:
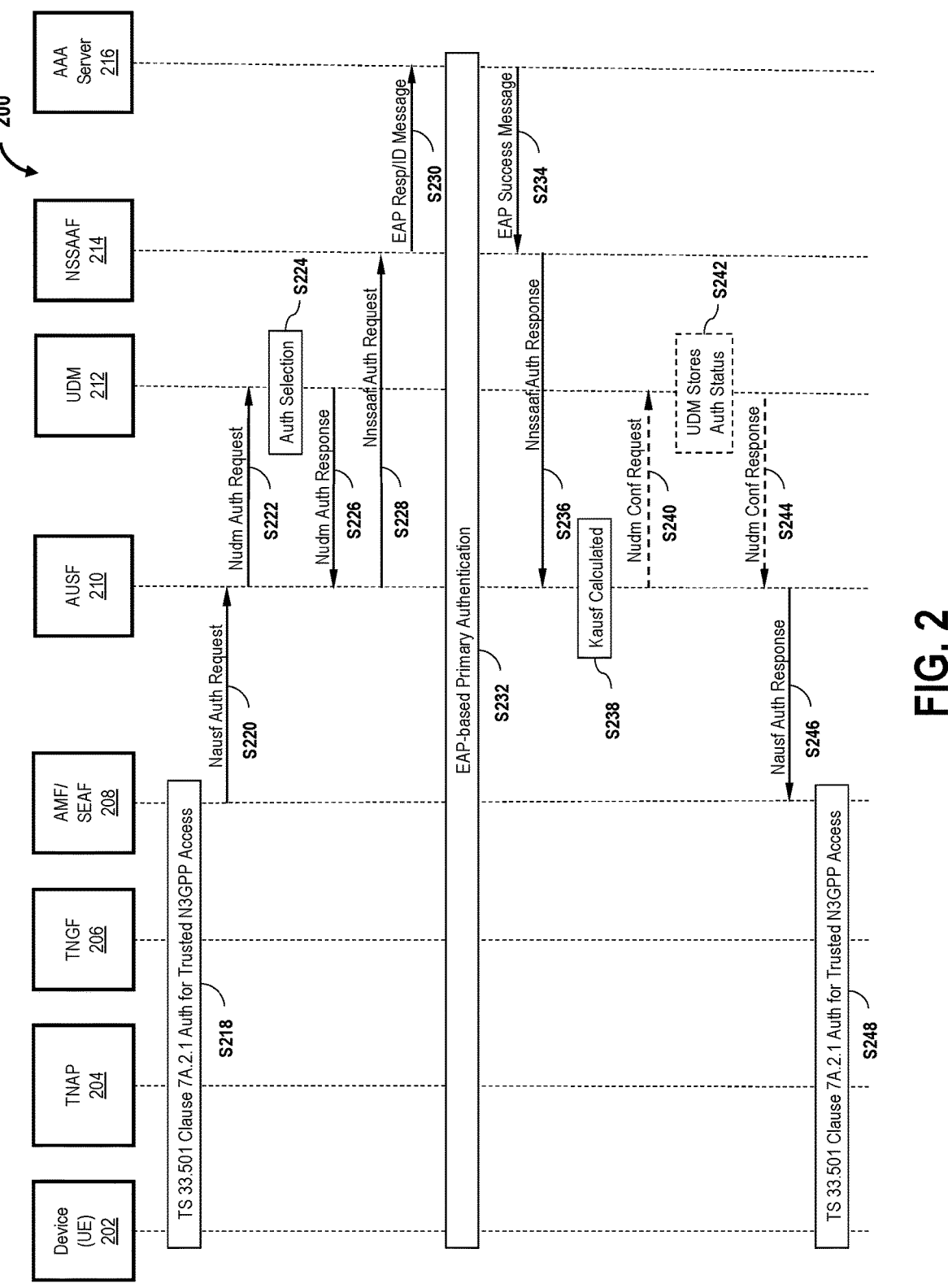
FIG. 2 is a sequence flow diagram depicting an exemplary authentication process through a trusted non-3GPP access type, in accordance with an embodiment.

FIG. 2 is a sequence flow diagram depicting an exemplary authentication process 200 through a trusted non-3GPP access type. In an exemplary embodiment, process 200 is executed among and with respect to a communication device 202 (e.g., a UE), a Trusted Non-3GPP Access Point (TNAP) 204, a Trusted Non-3GPP Gateway Function (TNGF) 206, an AMF/SEAF 208, an AUSF 210, a UDM 212, an NSSAAF 214, and an AAA server 216. The exemplary embodiment depicted in FIG. 2 is thus similar, in many aspects, to the embodiment depicted in FIG. 1, above, except that for process 200, UE 202 accesses AMF 208 through TNAP 204 and TNGF 206 (i.e., trusted NG3PP access), as opposed to the untrusted N3GPP access type (e.g., untrusted N3GPP access network 104, N3IWF 106) shown in FIG. 1. Unless described below to the contrary, one or more of the several steps, subprocesses, and/or subroutines of process 200 may be performed in a different order, and/or two or more of such steps/subprocesses/subroutines may be performed simultaneously.

In exemplary operation, process 200 begins at step S218, in which UE 202 accesses AMF 208 through the trusted N3GPP access type represented by TNAP 204 and TNGF 206. In an exemplary embodiment of step S218, registration and/or authentication execution between UE 202 and AMF 208 may be performed according to the procedures of Authorization for Trusted N3GPP Access specified in 3GPP TS 33.501 Clause 7A.2.1 (i.e., steps 1-7a). In step S220, AMF 208 sends an Nausf authentication request to AUSF 210 (e.g., an Nausf_UEAuthentication_AuthenticateRequest message), which may include an SUCI or an SUPI, and an SN-name.

In step S222, AUSF 210 sends an Nudm authentication request to UDM 112 (e.g., an Nudm_UEAuthentication_Get_Request message), which may include the SUCI or SUPI, and the SN-name. In step S224, the authentication method may be selected at UDM 212 based on the received Nudm authentication request. In step S226, UDM 212 sends AUSF 210 an Nudm authentication response (e.g., an Nudm_UE-Authentication_Get_Response message), which may include one or more of a SUPI and an AuthAAA IE.

In step S228, based on the received Nudm authentication response, AUSF 210 sends NSSAAF 214 an Nnssaaf authentication request (e.g., an Nnssaaf_AIWF_Authentication_Request message), which may further include the SUPI. In step S230, NSSAAF 214 sends an EAP Response/Identity message to AAA server 216. In step S232, AAA server 216 executes EAP-based primary authentication with UE 202. In step S234, AAA server 216 sends NSSAAF 214 an EAP Success message.

In step S236, NSSAAF 214 sends AUSF 210 an Nnssaaf authentication response (e.g., an Nnssaaf_AIWF_Authentication_Response message), which may further include one or more of the EAP Success message, the SUPI, and an MSK. In step S238, a Kausf key may be calculated from the MSK received in step S236.

Steps S240 through S244 are optional steps. In step S240, AUSF 210 may send to UDM 212 an Nudm confirmation request (e.g., an Nudm_UEAU_ResultConfirmation_Request message), which may include the SUPI. In step S242, UDM 212 may store the authentication status and, in step S244, send an Nudm confirmation response (e.g., an Nudm_UEAU_ResultConfirmation_Response message) to AUSF 212.

In step S246, AUSF 210 sends AMF 208 an Nausf authentication response (e.g., an Nausf_UEAuthentication_AuthenticateResponse message), which may include one or more of the EAP Success message, the SUPI, and a Kseaf key. In step S248, AMF 208 authenticates and registers UE 202 through TNAP 204 and TNGF 206. In an exemplary embodiment of step S248, registration and authentication of UE 202 by AMF 208 may be performed according to remaining procedures for Trusted N3GPP Access specified in 3GPP TS 33.501 Clause 7A.2.1 (i.e., steps 9-19).

Process 200 thus advantageously enables, similarly to process 100, FIG. 1, support for (a) credentials holder using the AAA server for primary authentication (b) key-generating EAP-based processes, (c) onboarding, and (d) utilization of an anonymous SUCI, but with respect to the trusted N3GPP access context, as opposed to the untrusted N3GPP access context shown in FIG. 1.

Figure 3:
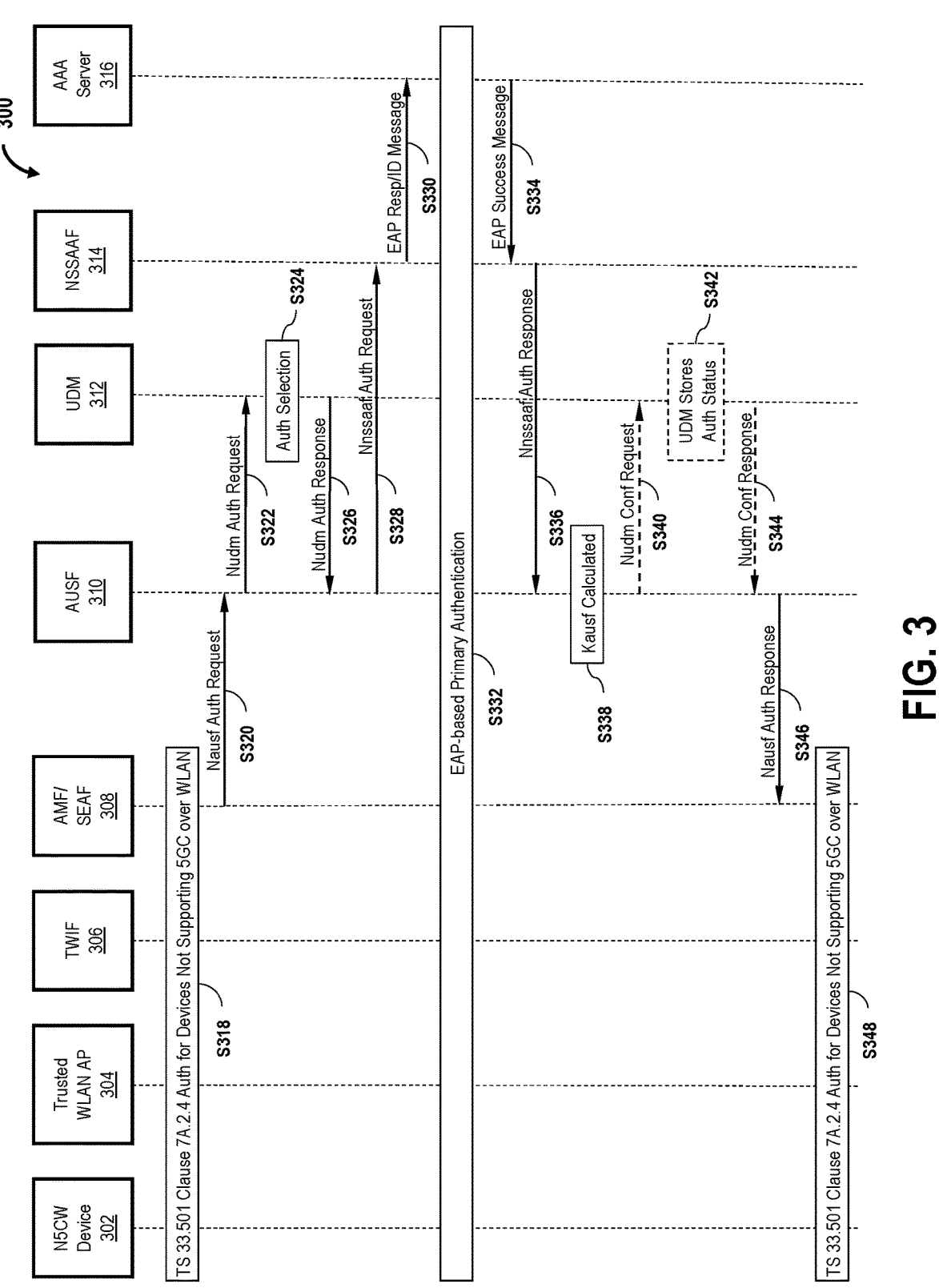
FIG. 3 is a sequence flow diagram depicting an exemplary authentication process for devices that do not support 5GC NAS over WLAN access, in accordance with an embodiment.

FIG. 3 is a sequence flow diagram depicting an exemplary authentication process 300 for devices that do not support 5G core (5GC) NAS over WLAN access. In an exemplary embodiment, process 300 is executed among and with respect to a communication device 302 (e.g., a Non-5G-Capable over WLAN (N5CW) device), a Trusted WLAN AP 304, a Trusted WLAN Interworking Function (TWIF) 306, an AMF/SEAF 308, an AUSF 310, a UDM 312, an NSSAAF 314, and an AAA server 316. The exemplary embodiment depicted in FIG. 3 is thus similar, in many aspects, to the embodiments depicted in FIGS. 1 and 2, above, except that for process 300, communication device 302 is depicted as an N5CW device, as opposed to a UE. Earlier versions of 3GPP TS 33.501 (e.g., v18.0.0) did not address authentication of N5CW devices using the AAA server as the credentials holder AAA.

Unless described below to the contrary, one or more of the several steps, subprocesses, and/or subroutines of process 300 may be performed in a different order, and/or two or more of such steps/subprocesses/subroutines may be performed simultaneously.

In exemplary operation, process 300 begins at step S318, in which device 302 accesses AMF 308 through the access type represented by Trusted WLAN AP 304 and TWIF 306. In an exemplary embodiment of step S318, registration and/or authentication execution between N5CW device 302 and AMF 308 may be performed according to the procedures of Authorization for Devices Not Supporting 5GC over WLAN specified in 3GPP TS 33.501 Clause 7A.2.4 (i.e., steps 1-4b). In step S320, AMF 308 sends an Nausf authentication request to AUSF 210 (e.g., an Nausf_UEAuthentication_AuthenticateRequest message), which may include an SUCI or SUPI, an SN-name, and an N5CW_indicator.

In step S322, AUSF 310 sends an Nudm authentication request to UDM 312 (e.g., an Nudm_UEAuthentication_Get_Request message), which may include one or more of the SUCI/SUPI, the SN-name, and the N5CW_indicator. In step S324, the authentication method may be selected at UDM 312 based on the received Nudm authentication request. In step S326, UDM 312 sends AUSF 310 an Nudm authentication response (e.g., an Nudm_UEAuthentication_Get_Response message), which may include one or more of a SUPI and an AuthAAA IE.

In step S328, based on the received Nudm authentication response, AUSF 310 sends NSSAAF 314 an Nnssaaf authentication request (e.g., an Nnssaaf_AIWF_Authentication_Request message), which may further include the SUPI. In step S330, NSSAAF 314 sends an EAP Response/Identity message to AAA server 316. In step S332, AAA server 316 executes EAP-based primary authentication with N5CW device 302. In step S334, AAA server 316 sends NSSAAF 314 an EAP Success message.

In step S336, NSSAAF 314 sends AUSF 310 an Nnssaaf authentication response (e.g., an Nnssaaf_AIWF_Authentication_Response message), which may further include one or more of the EAP Success message, the SUPI, and an MSK. In step S338, a Kausf key may be calculated from the MSK received in step S336.

Steps S340 through S344 are optional steps. In step S340, AUSF 310 may send to UDM 312 an Nudm confirmation request (e.g., an Nudm_UEAU_ResultConfirmation_Request message), which may include the SUPI. In step S342, UDM 312 may store the authentication status and, in step S344, send an Nudm confirmation response (e.g., an Nudm_UEAU_ResultConfirmation_Response message) to AUSF 312.

In step S346, AUSF 310 sends AMF 308 an Nausf authentication response (e.g., an Nausf_UEAuthentication_AuthenticateResponse message), which may include one or more of the EAP Success message, the SUPI, and a Kseaf key. In step S348, AMF 308 authenticates and registers N5CW device 302 through Trusted WLAN AP 304 and TWIF 306. In an exemplary embodiment of step S348, registration and authentication of N5CW device 302 by AMF 308 may be performed according to remaining procedures of Authorization for Devices Not Supporting 5GC over WLAN specified in 3GPP TS 33.501 Clause 7A.2.4 (i.e., steps 9-14).

Process 300 thus advantageously enables, similarly to processes 100, FIG. 1, 200, FIG. 2, support for (a) credentials holder using the AAA server for primary authentication (b) key-generating EAP-based processes, and (c) utilization of an anonymous SUCI, but with respect to N5CW devices accessing the SNPN. As illustrated in FIG. 3, systems and methods according to process 300 further advantageously enable support for an SNPN ID (e.g., a Public Land Mobile Network Identifier (PLMN ID) and a Network Identifier (NID)) carried in a Network Access Identifier (NAI).

Figure 4:
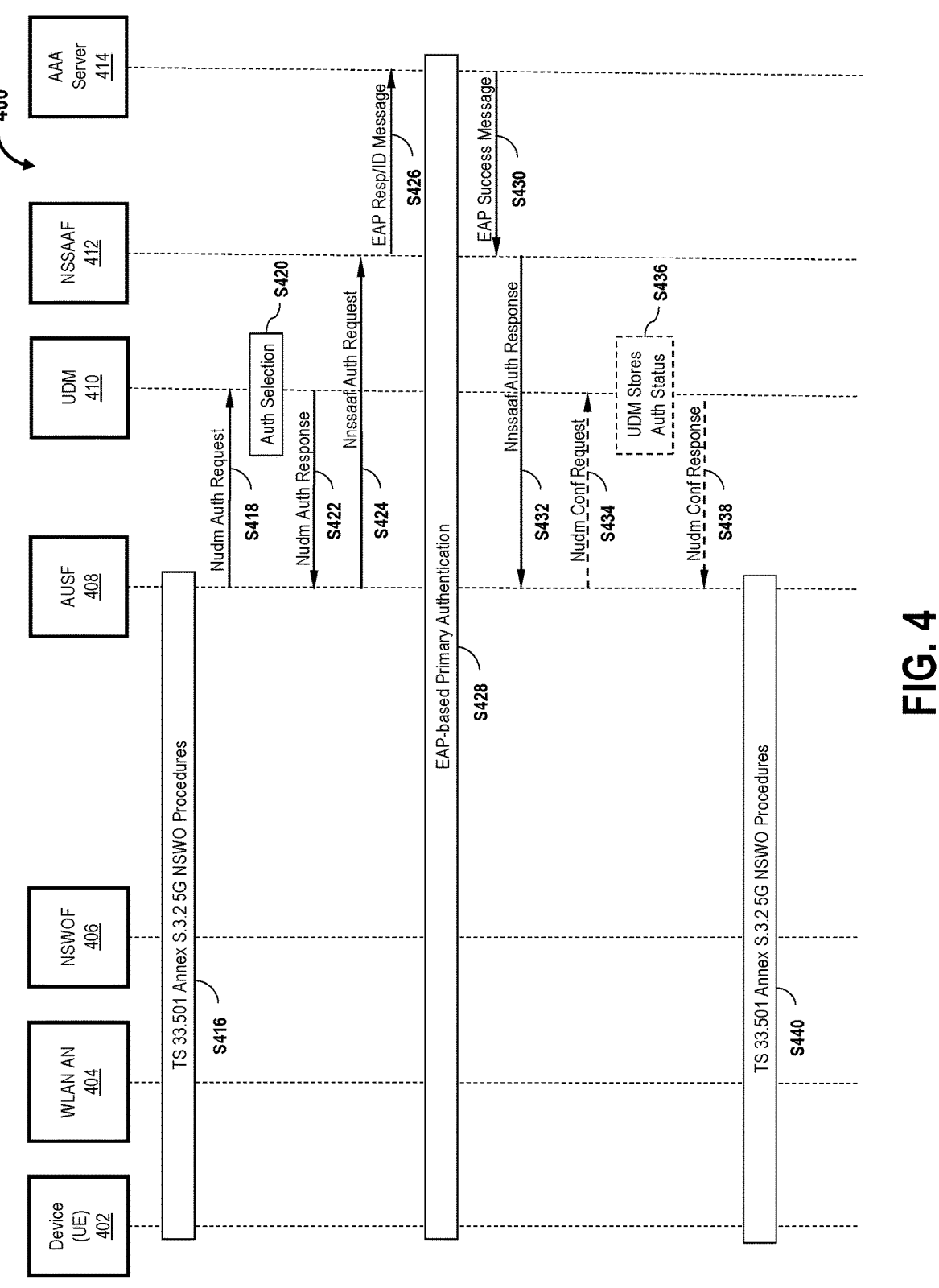
FIG. 4 is a sequence flow diagram depicting an exemplary authentication process for 5G NSWO procedures, in accordance with an embodiment.

FIG. 4 is a sequence flow diagram depicting an exemplary authentication process 400 for 5G NSWO procedures. In an exemplary embodiment, process 400 is executed among and with respect to a communication device 402 (e.g., a UE), a WLAN access network 404, a Non-Seamless WLAN Offload Function (NSWOF) 406, an AUSF 408, a UDM 410, an NSSAAF 412, and an AAA server 414. The exemplary embodiment depicted in FIG. 3 is thus similar, in many aspects, to the embodiments depicted in FIGS. 1-3, above, except that for process 400, UE 402 accesses AUSF 408 through WLAN access network 404 and NSWOF 406, and thus may not require utilization of an AMF. Unless described below to the contrary, one or more of the several steps, subprocesses, and/or subroutines of process 400 may be performed in a different order, and/or two or more of such steps/subprocesses/subroutines may be performed simultaneously.

In exemplary operation, process 400 begins at step S416, in which UE 402 accesses AUSF 308 through the NSWO access type represented by WLAN access network 404 and NSWOF 406. In an exemplary embodiment of step S416, registration and/or authentication execution between UE 402 and AUSF 408 may be performed according to the NSWO procedures specified in 3GPP TS 33.501 Annex S.3.2 (i.e., steps 1-5). In at least one embodiment of step S416, in the case where the EAP method supports privacy and UE 402 is configured to use anonymous SUCI, steps 1-5 of the 3GPP TS 33.501 Annex S.3.2 NSWO procedures are executed with an additional substep where UE 402 may additionally send an anonymous value SUCI based on the configuration.

In step S418, AUSF 408 sends UDM 410 an Nausf authentication request (e.g., an Nausf_UEAuthentication_Get_Request message), which may include one or more of the SUCI, an SN-name, and an NSWO_indicator. In step S420, the authentication method may be selected at UDM 410 based on the received Nudm authentication request. In step S422, UDM 410 sends AUSF 408 an Nudm authentication response (e.g., an Nudm_UE-Authentication_Get_Response message), which may include one or more of a SUPI and an AuthAAA IE. In at least one embodiment, steps S418 through S422 may be optional.

In step S424, based on the received Nudm authentication response, AUSF 408 sends NSSAAF 412 an Nnssaaf authentication request (e.g., an Nnssaaf_AIWF_Authentication_Request message), which may further include the SUPI. In step S426, NSSAAF 412 sends an EAP Response/Identity message (e.g., also including the SUPI) to AAA server 414. In step S428, AAA server 414 executes EAP-based primary authentication with UE 402. In step S430, AAA server 414 sends NSSAAF 412 an EAP Success message, which may include the SUPI and an MSK. In step S432, NSSAAF 412 sends AUSF 408 an Nnssaaf authentication response (e.g., an Nnssaaf_AIWF_Authentication_Response message), which may further include one or more of the EAP Success message, the SUPI, and the MSK.

Steps S434 through S438 are optional steps. In step S434, AUSF 408 may send UDM 410 an Nudm confirmation request (e.g., an Nudm_UEAU_ResultConfirmation_Request message), which may include the SUPI. In step S436, UDM 410 may store the authentication status and, in step S438, send AUSF 408 an Nudm confirmation response (e.g., an Nudm_UEAU_ResultConfirmation_Response message).

In step S440, AUSF 408 authenticates UE 402 through WLAN access network 404 and NSWOF 406. In an exemplary embodiment of step S440, authentication of UE 402 by AUSF 408 may be performed according to remaining NSWO procedures specified in 3GPP TS 33.501 Annex S.3.2 (i.e., steps 16-18d).

Systems and methods according to process 400 thus represent an advantageous procedural solution supporting NSWO using SNPN credentials from the credentials holder AAA server (e.g., AAA server 414) by way of the 5GC. More particularly, according to process 400, WLAN access network 404 is advantageously enabled to route authentication messages to credentials holder AAA server 414 by way of the 5GC (e.g., NSWOF 406/AUSF 408/UDM 410/NSSAAF 412). This innovative solution therefore addresses KI #1 NSWO using SNPN credentials from a credentials holder AAA.

Accordingly, process 400 may be seamlessly integrated with the existing NSWO procedures specified in TS 33.501 Annex S.4, as well as the AAA server primary authentication procedures specified in TS 33.501 Clause I.2.2.2, and without significantly impacting the operation or performance of the UE (e.g., UE 402), the WLAN access network (e.g., WLAN access network 404), or the 5GC. Systems and methods according to process 400 are therefore particularly useful for operators utilizing the 5GC to manage and control UEs for both 3GPP and N3GPP access.

Figure 5:
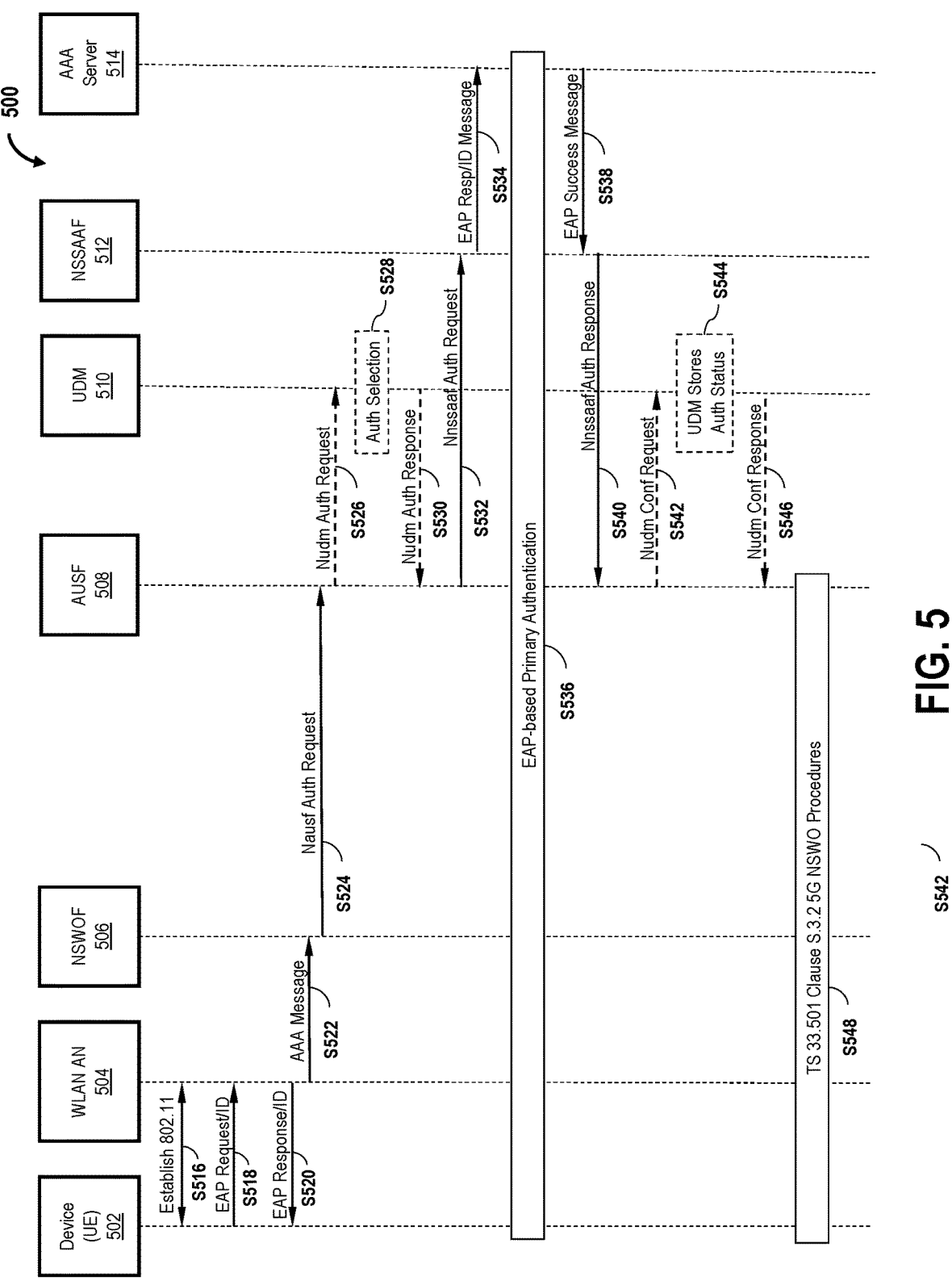
FIG. 5 is a sequence flow diagram depicting an alternative authentication process for 5G NSWO procedures, in accordance with an embodiment.

FIG. 5 is a sequence flow diagram depicting an alternative authentication process 500 for 5G NSWO procedures. In an exemplary embodiment, process 500 is structurally similar to process 400, FIG. 4, and may be executed among and with respect to a UE 502, a WLAN access network 504, an NSWOF 506, an AUSF 508, a UDM 510, an NSSAAF 512, and an AAA server 514. According to process 500 though, NSWO procedures may be executed between UE 502 and AAA server 514 (i.e., the credentials holder) by way of NSWOF 506 and the 5GC. Unless described below to the contrary, one or more of the several steps, subprocesses, and/or subroutines of process 400 may be performed in a different order, and/or two or more of such steps/subprocesses/subroutines may be performed simultaneously.

In exemplary operation, process 500 begins at step S516, in which UE 502 establishes an 802.11-type connection with WLAN access network 504. In step S518, WLAN access network 504 sends UE 502 an EAP Request/Identity message. In step S520, UE 502 sends WLAN access network 504 an EAP Response/Identity message, which, in this alternative embodiment, includes a SUPI. In step S522, WLAN access network 504 sends NSWOF 506 an AAA message, including the EAP Response/Identity message and the SUPI. In step S524, NSWOF 506 sends AUSF 508 an Nausf authentication request (e.g., an Nausf_UEAuthentication_Authenticate_Request message), including the SUPI, an SN-name, and an NSWO_indicator.

In this alternative embodiment, steps S516 through S524 may be seen to be similar, in many aspects, to step S416, FIG. 4 (e.g., steps 1-5 of 3GPP TS 33.501 Annex S.3.2 NSWO procedures), except that UE 502 provides a SUPI instead of a SUCI. In an exemplary embodiment, in the case where the particular EAP method supports privacy, and where UE 502 is configured to utilize an anonymous SUPI, UE 502 may be further configured to provide an anonymous SUPI.

Steps S526 through S530 are optional steps. In step S526, AUSF 508 may send UDM 510 an Nausf authentication request (e.g., an Nausf_UEAuthentication_Get_Request message), which may include one or more of the SUPI, the SN-name, and the NSWO_indicator. Optional step S526 is thus similar to step S418, FIG. 4, except that the Nausf authentication request of optional step S526 includes a SUPI instead of a SUCI. In step S528, the authentication method may be selected at UDM 510 based on the received Nudm authentication request. In step S530, UDM 510 may send AUSF 508 an Nudm authentication response (e.g., an Nudm_UEAuthentication_Get_Response message), which may include one or more of the SUPI and an AuthAAA IE.

In step S532, AUSF 508 sends NSSAAF 512 an Nnssaaf authentication request (e.g., an Nnssaaf_AIWF_Authentication_Request message), which includes the SUPI. In step S534, NSSAAF 512 sends AAA server 514 an EAP Response/Identity message. In step S536, AAA server 514 executes EAP-based primary authentication with UE 502. In step S538, AAA server 514 sends NSSAAF 512 an EAP Success message. In step S540, NSSAAF 512 sends AUSF 508 an Nnssaaf authentication response (e.g., an Nnssaaf_AIWF_Authentication_Response message), including the EAP Success message, the SUPI, and an MSK.

Steps S542 through S546 are also optional steps. In step S542, AUSF 508 may send UDM 510 an Nudm confirmation request (e.g., an Nudm_UEAU_Result Confirmation_Request message), which may include the SUPI. In step S544, UDM 510 may store the authentication status and, in step S546, send AUSF 508 an Nudm confirmation response (e.g., an Nudm_UEAU_ResultConfirmation_Response message).

In step S548, AUSF 508 authenticates and registers UE 502 through WLAN access network 504 and NSWOF 506. In an exemplary embodiment of step S548, registration and authentication of UE 502 by AUSF 508 may be performed according to steps 16-18d of the NSWO procedures specified in 3GPP TS 33.501 Annex S.3.2.

In an exemplary embodiment, process 500 may implemented with respect to the reference architecture depicted in 3GPP TS 23.501 FIG. 4.2.15-3b (supporting authentication for NSWOF using SNPN credentials from credentials holder AAA Server), as well as the accompanying description therewith, the subject matter of which is incorporated by reference herein in its entirety.

In an exemplary embodiment, implementation of process 500 further enables UEs (e.g., UE 502) to support NSWO in the SNPN without the need for additional utilization of conventional key-generating EAP techniques. For example, through utilization of SNPN credentials with credentials holder AAA server 514 (e.g., the MSK included in step S540), EAP authentication (e.g., step S536) may be executed directly between UE 502 and credentials holder AAA server 514 with requiring the interceding involvement of NSWOF 506, AUSF 508, or UDM 510. Accordingly, UE 502 also need not be configured with a constructed SUCI.

In some embodiments, it may be desirable, in the N3GPP context, to use the same key-generating EAP technique used for the conventional SNPN-over-3GPP-access context, which includes an EAP identity privacy mechanism. In this N3GPP context, it may be implied that, for NSWO support in the SNPN using a credentials holder AAA server, identity privacy may be achieved at the EAP layer (i.e., by way of means specific to the particular EAP method).

According to the embodiments described above, N3GPP routing of authentication messages to a credentials holder AAA server (e.g., in the SNPN context) is advantageously supported (a) through the 5GC in the cases of (i) 3GPP access, (ii) untrusted N3GPP access, (iii) trusted non-3GPP access, and (iv) for N5CW procedures, and (b) through the 5GC and apart from the 5GC for NSWO procedures. According to the embodiments described herein, unauthorized access to operator's WLAN access network (e.g., in the case where UDM subscription data is not checked) may be advantageously mitigated or prevented.

Exemplary embodiments of systems and methods for AAA server primary authentication for non-3GPP access are described above in detail. The several examples above are described with respect to 5G capabilities, but the person of ordinary skill in the art will understand that the principles herein are not exclusive of 6G technology or other developing standards. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

The computer-implemented methods discussed herein may include additional, less, or alternate actions, including those discussed elsewhere herein. The methods may be implemented via one or more local or remote processors, transceivers, servers, and/or sensors, and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method of accessing a non-public network (NPN) by a communication device utilizing a credential management system, comprising the steps of:

receiving, from the communication device through non-Third Generation Partnership Project (N3GPP) access means, a first authentication request at an authentication server function (AUSF) of a 5th generation (5G) core (5GC) in communication with the NPN;

sending a second authentication request from the AUSF to a network slice-specific authentication and authorization function (NSSAAF) of the 5GC;

transmitting, from the NSSAAF, an extensible authentication protocol (EAP) response/identity message to an authentication, authorization, and accounting (AAA) server in communication with the credential management system;

performing, based on the EAP response/identity message, EAP-based authentication between the AAA server and the communications device;

receiving, at the NSSAAF from the AAA server, an EAP success message;

receiving, at the AUSF from the NSSAAF, a first authentication response; and authenticating the communication device with the NPN.

2. The method of claim 1, wherein the step of authenticating the communication device includes a sub-step of registering the communication device.

3. The method of claim 1, wherein the AAA server is configured to operate as a credentials holder for the credential management system.

4. The method of claim 3, wherein the communication device is one of a user equipment device (UE) and a non-5th generation(5G) capable over Wireless Local Area Network (WLAN) (N5CW) device.

5. The method of claim 4, wherein the step of receiving the first authentication request though the N3GPP access means includes an access and mobility management function (AMF) interposed between the N3GPP access means and the AUSF.

6. The method of claim 5, wherein the communication device is the UE, and wherein the N3GPP access means includes an untrusted N3GPP access network and an N3GPP Interworking Function (N3IWF).

7. The method of claim 5, wherein the communication device is the UE, and wherein the N3GPP access means includes a trusted N3GPP access point (TNAP) and a trusted N3GPP gateway function (TNGF).

8. The method of claim 5, wherein the communication device is the N5CW device, and wherein the N3GPP access means includes a trusted WLAN access point and a trusted WLAN interworking function (TWIF).

9. The method of claim 4, wherein the communication device is the UE, and wherein the N3GPP access means includes a WLAN access network and a non-seamless WLAN offload function (NSWOF).

10. The method of claim 9, wherein the WLAN access network is configured to route authentication messages from the UE to the AAA server indirectly through the 5GC.

11. The method of claim 9, wherein the WLAN access network is configured to route authentication messages from the UE directly to the AAA server.

12. The method of claim 4, wherein the 5GC further includes a unified data management subsystem (UDM) interposed between the AUSF and the NSSAAF.

13. The method of claim 12, further comprising a step of sending, after the step of receiving the first authentication request and prior to sending the second authentication request, a third authentication request from the AUSF to the UDM.

14. The method of claim 13, wherein the step of sending the second authentication request is based on a second authentication response to the third authentication request received at the AUSF from the UDM.

15. The method of claim 14, wherein the UDM is configured to select an authentication method before sending the second authentication request and after receiving the third authentication request.

16. The method of claim 14, wherein the UDM is further configured to store an authentication status in response to a confirmation request from the AUSF.

17. The method of claim 3, wherein the first authentication request includes one or more of a subscriber/subscription concealed ID (SUCI), a service network (SN)-name, and a Non-Seamless WLAN Offload indicator (NSWO indicator).

18. The method of claim 3, wherein the second authentication request includes a subscriber/subscription Permanent identifier (SUPI).

19. The method of claim 3, wherein the NPN is a standalone NPN (SNPN).

20. A system for enabling a user equipment device (UE) to accessing a standalone non-public network (SNPN) utilizing a credential management subsystem, the system comprising:

an authentication server function (AUSF) of a 5G core (5GC) in communication with the SNPN;

a processor; and a memory having computer-executable instructions stored therein, which, when executed by the processor, cause the AUSF to:

receive, from the UE through non-Third Generation Partnership Project (N3GPP) access means, a first authentication request, wherein the first authentication request includes a service network (SN)-name and one of (a) a subscriber/subscription concealed identifier (SUCI) and a Non-Seamless WLAN Off-load indicator NSWO_indicator), and (b) a sub-scriber/subscription Permanent ID (SUPI) and an NSWO_indicator;

send a second authentication request to an authentica-tion, authorization, and accounting (AAA) server in communication with the credential management sys-tem, wherein the second authentication request includes the SUPI;

enable, based on an extensible authentication protocol (EAP) response/identity message, EAP-based authentication between the AAA server and the UE;

receive, at the AUSF, a first authentication response to the second authentication message, wherein the first authentication response includes at least one of the SUPI, the EAP response/identity message, and a master session key (MSK) provided by the AAA server; and authenticate the communication device with the SNPN based on the first authentication response.

\* \* \* \* \*